May 31, 1960 E. V. BLOMMÉ 2,938,414
SCREW VISES
Filed May 5, 1959
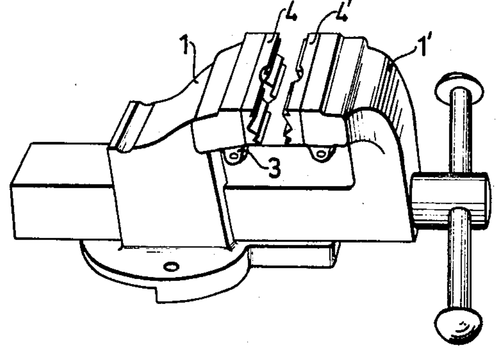
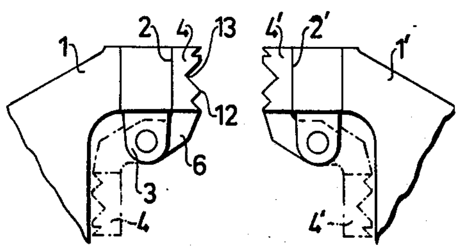
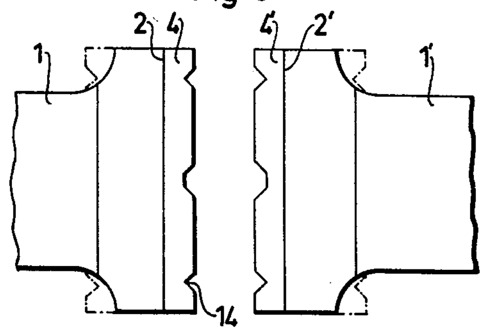
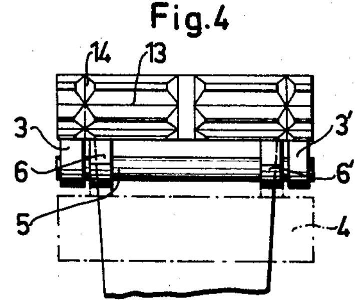
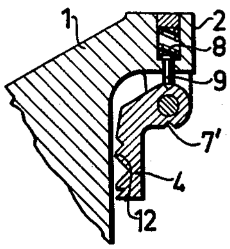
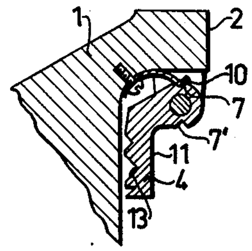
INVENTOR
ERIC VALDEMAR BLOMME
BY [signature]
attorney United States Patent Office 2,938,414 Patented May 31, 1960

2,938,414

SCREW VISES

Erik Valdemar Blommé, Svandammsvagen 4, Hagersten, Sweden

Filed May 5, 1959, Ser. No. 811,028

3 Claims. (Cl. 81—38)

This invention relates to improvements in or relating to screw vises, and has for its object to facilitate the clamping of workpieces of various shapes.

It is previously known to provide the jaws of screw vises with fixed or removable linings of, for instance, lead, firstly, to protect the jaws from mechanical damage, and, secondly, to protect the surfaces of the workpieces.

Notwithstanding the fact that such linings have been used it has often proved to be very difficult, and sometimes almost impossible, to clamp, for instance, round or very thin workpieces to be worked on by means of various tools, in screw vises of the above mentioned kind.

Accordingly, there has long been a demand for a simple and inexpensive means to remedy the above indicated drawback in connection with screw vises of the above mentioned type.

According to the present invention, said demand is met in a very effective manner, particularly because the means in question is provided directly on the screw vise proper, and thus is always readily accessible.

Accordingly, the primary object of the present invention is to provide a screw vise of the kind comprising two jaws with opposing, parallel clamping surfaces, wherein one of said jaws is movable toward and away from the other one to clamp a workpiece therebetween, and to permit removing of the workpiece therefrom, respectively, each jaw having attached thereto a lining member, which is movable to a position in front of the clamping surface of the corresponding jaw, said lining members being hingedly secured to said jaws and being formed with a clamping surface to permit an alternative clamping of the workpiece either between the clamping surfaces of said jaws or between the clamping surfaces of said lining members.

Another object of the invention is to provide a screw vise of the above mentioned type wherein said lining members are hingedly secured to lugs provided on said jaws, at the underside thereof and adjacent the clamping surfaces thereof, said lining members being movable into such a position that the jaws may be moved into an abutting relationship without said lining members obstructing such movement.

Yet another object of the present invention is to provide a screw vise according to the just discussed objects wherein said jaws are provided with locking means adapted to cooperate with said lining members to lock them, firstly, in a position resting against the clamping surfaces of the corresponding jaw, and, secondly, in a position wherein said clamping surfaces of the jaws are exposed.

The invention will be disclosed in more detail hereinafter with reference to the accompanying drawing, wherein one embodiment of the screw vise according to the invention is illustrated as a nonlimiting example.

Fig. 1 is a perspective view of a screw vise according to the invention;

Fig. 2 is an elevation of parts of the jaws of the screw vise as shown in Fig. 1, drawn to an enlarged scale;

Fig. 3 is a top plan view of the jaws as shown in Fig. 2;

Fig. 4 is an end view of one of the jaws as shown in Figs. 2 and 3;

Fig. 5 is a sectional elevation of one jaw with the corresponding lining member and a locking means therefor;

Fig. 6 is a sectional elevation, corresponding to Fig. 5, but illustrating an alternative embodiment.

In the drawing 1 and 1′ designate the jaws of the screw vise. Said jaws are formed with vertically disposed flat clamping surfaces 2 and 2′, respectively. Each jaw 1, 1′ is provided, at the underside thereof, with two depending lugs 3, 3′, to which lining means 4, 4′ are hingedly secured in that a pivot pin 5 which passes through said lugs 3, 3′ passes also through lugs 6, 6′ provided on said lining members 4, 4′. Each lug 6, 6′ of said lining members 4, 4′ is provided with two notches 7, 7′, which are adapted to alternatively cooperate with locking members provided in the jaws 1, 1′ in a manner such that the lining members 4, 4′ may be locked in two alternative positions, viz. one in an abutting relationship with respect to the clamping surface of the corresponding jaw, and the other to expose said clamping surfaces of the corresponding jaws. A locking means is provided by a stud 9 which is loaded by a pressure spring 8 and may enter one of the notches 7, 7′, Fig. 5. It is, however, also possible to use a leaf spring 10 which is fixedly secured to the underside of the jaws 1, 1′ and formed with a bead which engages with one of the notches 7, 7′. Each lining member 4, 4′ is formed with a flat surface 11 to abut the clamping surface 2, 2′ of the corresponding jaw 1, 1′, and further with a clamping surface 12, which is disposed parallel to the just mentioned flat surface. The clamping surfaces 12 of the lining members 4, 4′ are formed with horizontally disposed, parallel grooves 13, and vertically disposed, parallel grooves 14, which grooves 13 and 14 are intended to provide for the holding of workpieces of, for instance, round shape. The horizontally disposed grooves at the free or upper edges of the lining members 4, 4′ provide a slot of rectilinear form when the lining members 4, 4′ are moved up against each other, in which case said grooves may be used to hold comparatively thin workpieces.

The screw vise operates and is used in the following manner:

When the lining members 4, 4′ are swung down and locked the screw vise is used in the ordinary way, i.e. the workpiece is clamped between the clamping surfaces 2, 2′ of the jaws 1, 1′. In this case, the lining members 4, 4′ are disposed inside the clamping surfaces 2, 2′ of the jaws 1, 1′, and thus do not obstruct the clamping of the workpieces. When the lining members 4, 4′ are swung upwardly and locked into the position abutting the clamping surfaces 2, 2′ of the jaws, the clamping surfaces 12 of said lining members 4, 4′ are used to hold certain workpieces, whereas the grooves 13, 14 are used as clamping means for workpieces of such a shape, that it is difficult to clamp them between the flat clamping surfaces 2, 2′ of the jaws 1, 1′.

Of course, the invention is not limited to the embodiments as disclosed herein, as several modifications and alterations as to the constructional details may be made within the scope thereof.

What I claim is:

1. A screw vise having two jaws with opposing, parallel clamping surfaces, wherein one of said jaws is movable towards and away from the other one to clamp a workpiece therebetween, and to permit removing of the workpiece therefrom, respectively, each jaw having attached thereto a lining member, which is movable to a position in front of the clamping surface of the corresponding jaw, said lining members being hingedly secured to said jaws and being each formed with a clamping surface to permit an alternative clamping of the workpiece either between the clamping surfaces of said jaws or between the clamping surfaces of said lining members, and wherein said lining members are hingedly secured to lugs provided on said jaws, at the underside thereof and adjacent the clamping surfaces thereof, said lining members being movable into such a position that the jaws may be moved into an abutting relationship without said lining members obstructing such movement, and wherein said jaws are provided with locking means adapted to cooperate with said lining members to lock them, firstly, in a position resting against the clamping surfaces of the corresponding jaw, and, secondly, in a position wherein said clamping surfaces of the jaws are exposed, the clamping surfaces of said lining members being provided with horizontally and vertically disposed, parallel grooves.

2. A screw vise as claimed in claim 1, wherein one of the horizontally disposed groves adjacent the free edge of each lining member is formed in such a manner that a rectilinear slot is obtained as the clamping surfaces of said lining members are placed in abutting relationship.

3. A screw vise of the kind described comprising, two jaws with opposing, parallel clamping surfaces, one of said jaws being movable toward and away from the other jaw to clamp a workpiece between them or to permit removal of the workpiece from between the jaws, each jaw having a lining member attached to it, said lining member being movable to a position in front of the clamping surface of the corresponding jaw, said lining members being hingedly secured to said jaws and being formed with a clamping surface to permit an alternative clamping of the workpiece either between the clamping surfaces of said jaws or between the clamping surfaces of said lining members, said jaws being provided with locking means adapted to co-operate with said lining members to lock the lining members firstly, in a position resting against the clamping surfaces of the corresponding jaws, and secondly in a position wherein the clamping surfaces of the jaws are exposed.

References Cited in the file of this patent

UNITED STATES PATENTS

| | | |
|---|---|---|
| 598,332 | Allen | Feb. 1, 1898 |
| 1,144,828 | Fegley et al. | June 29, 1915 |
| 1,718,864 | McLean | June 25, 1929 |
| 2,646,708 | Nickas | July 28, 1953 |

FOREIGN PATENTS

| | | |
|---|---|---|
| 422,944 | Germany | Dec. 16, 1925 |